United States Patent
Nakamura et al.

(10) Patent No.: US 11,485,911 B2
(45) Date of Patent: Nov. 1, 2022

(54) FLAME RETARDANT COMPOSITION, FLAME-RETARDANT RESIN COMPOSITION USING SAME, MOLDED ARTICLE, AND METHOD FOR PRODUCING MOLDED ARTICLE

(71) Applicant: ADEKA CORPORATION, Tokyo (JP)

(72) Inventors: Michio Nakamura, Saitama (JP); Genta Kokura, Saitama (JP); Kohei Omori, Saitama (JP); Yuri Yokota, Saitama (JP); Yutaka Yonezawa, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 17/612,627

(22) PCT Filed: Jul. 16, 2020

(86) PCT No.: PCT/JP2020/027618
§ 371 (c)(1),
(2) Date: Nov. 19, 2021

(87) PCT Pub. No.: WO2021/020140
PCT Pub. Date: Feb. 4, 2021

(65) Prior Publication Data
US 2022/0220386 A1   Jul. 14, 2022

(30) Foreign Application Priority Data
Jul. 26, 2019   (JP) .............................. JP2019-137987

(51) Int. Cl.
| | | |
|---|---|---|
| C09K 21/12 | (2006.01) | |
| C08K 3/32 | (2006.01) | |
| C08K 5/529 | (2006.01) | |
| C09K 21/04 | (2006.01) | |
| C08K 5/3492 | (2006.01) | |
| C08K 5/52 | (2006.01) | |

(52) U.S. Cl.
CPC ............... C09K 21/12 (2013.01); C08K 3/32 (2013.01); C08K 5/34922 (2013.01); C08K 5/5205 (2013.01); C08K 5/529 (2013.01); C09K 21/04 (2013.01); C08K 2003/328 (2013.01)

(58) Field of Classification Search
CPC ..................................................... C09K 21/12
See application file for complete search history.

(56) References Cited

U.S. PATENT DOCUMENTS

| | | |
|---|---|---|
| 6,369,137 B2 | 4/2002 | Kersjes et al. |
| 6,653,474 B1 | 11/2003 | Kersjes et al. |
| 7,449,577 B2 | 11/2008 | Kimura et al. |
| 11,339,273 B2 | 5/2022 | Daihachi |
| 2001/0005745 A1 | 6/2001 | Kersjes et al. |
| 2006/0167256 A1 | 7/2006 | Kimura et al. |
| 2008/0157036 A1 | 7/2008 | Ogawa |
| 2008/0241529 A1* | 10/2008 | Bauer ............... C09J 11/06 106/217.7 |
| 2008/0269384 A1 | 10/2008 | Naegerl et al. |
| 2015/0183991 A1 | 7/2015 | Yamamoto |
| 2019/0153322 A1* | 5/2019 | Bauer ............... C09K 21/12 |
| 2021/0171735 A1 | 6/2021 | Daihachi |

FOREIGN PATENT DOCUMENTS

| | | |
|---|---|---|
| JP | 2005-120021 A | 5/2005 |
| JP | 2010-229139 A | 10/2010 |
| JP | 2011-174095 A | 9/2011 |
| JP | 2014-12704 A | 1/2014 |
| JP | 2017-137476 | 8/2017 |
| WO | 2006/027340 | 3/2006 |
| WO | WO 2016/182059 A1 | 11/2016 |
| WO | 2019/093066 | 5/2019 |

OTHER PUBLICATIONS

ISR for PCT/JP2020/027618, dated Sep. 24, 2020.
Office Action issued with respect to Brazilian Application No. BR 11 2021 023844-1, dated Jul. 16, 2020; with English translation.

* cited by examiner

*Primary Examiner* — Brieann R Johnston
(74) *Attorney, Agent, or Firm* — Greenblum & Bernstein, P.L.C.

(57) ABSTRACT

A flame retardant composition according to the present invention is a phosphate-based flame retardant including a (poly)phosphate, in which F and N satisfy $8.0 \times 10^{-4} \leq F/N \leq 20.0$ and $F \leq 21.0$, assuming that F (ppm) is a content of elemental iron and N (ppm) is a content of elemental sodium in the flame retardant composition as measured in accordance with the following procedure.

16 Claims, 2 Drawing Sheets

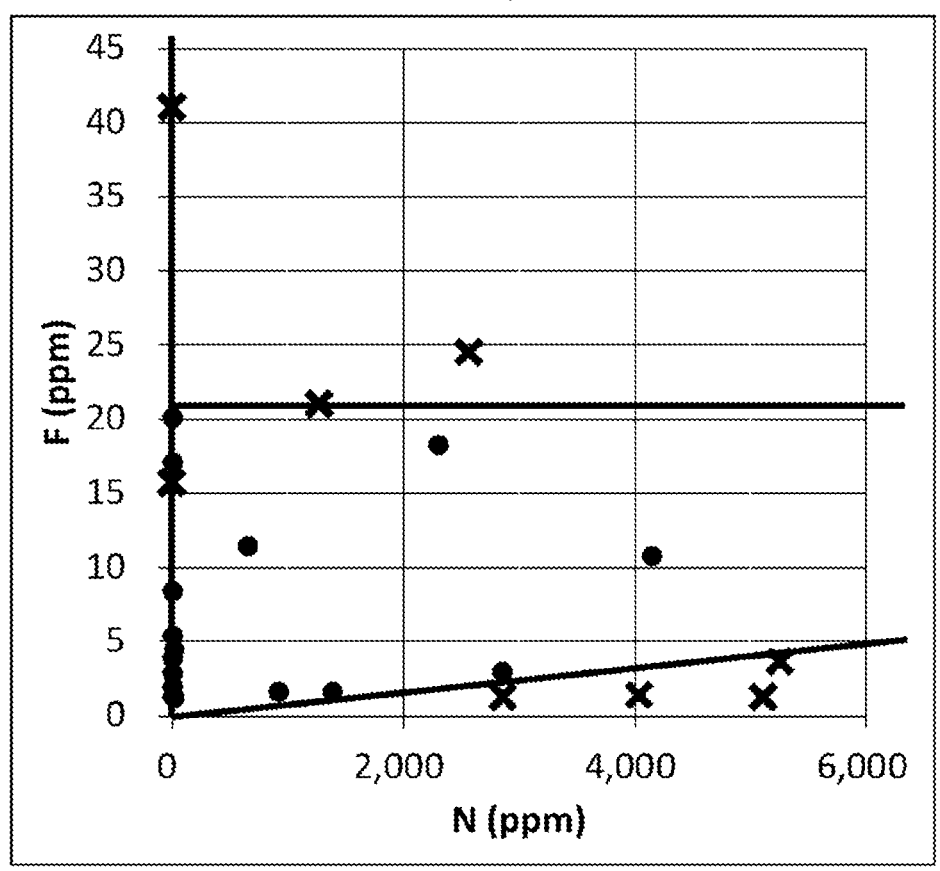

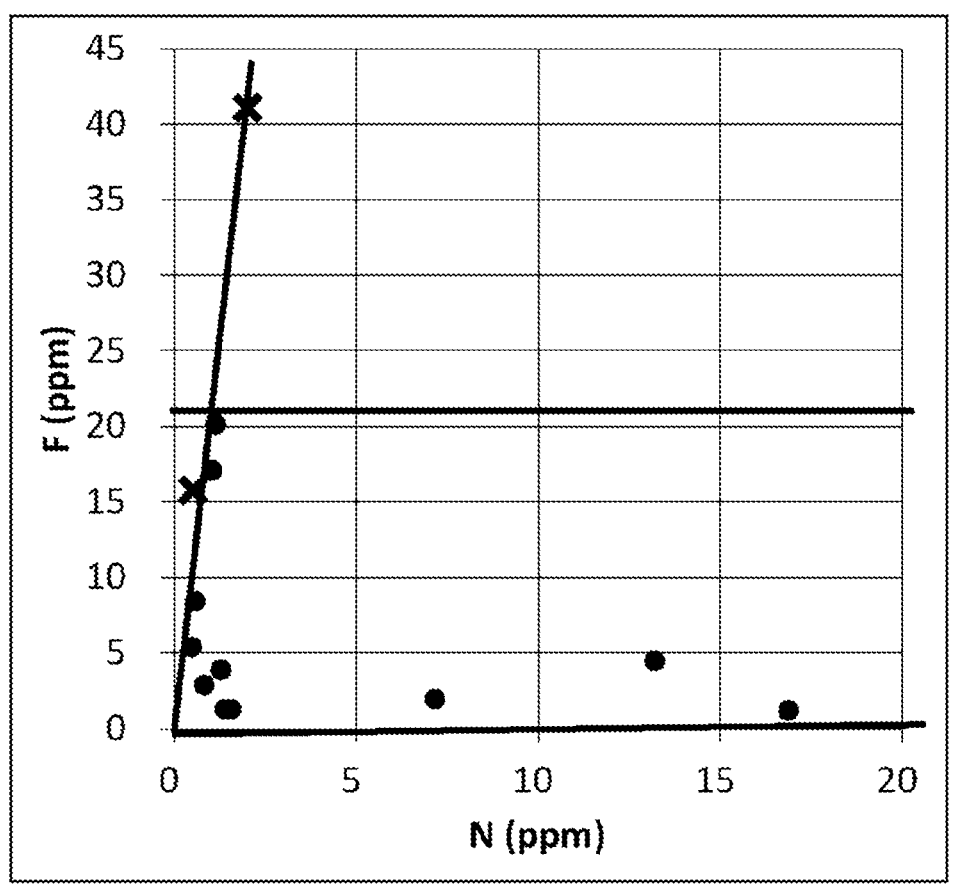

FLAME RETARDANT COMPOSITION, FLAME-RETARDANT RESIN COMPOSITION USING SAME, MOLDED ARTICLE, AND METHOD FOR PRODUCING MOLDED ARTICLE

TECHNICAL FIELD

The present invention relates to a flame retardant composition, a flame-retardant resin composition using the same, a molded article, and a method for producing a molded article.

BACKGROUND ART

Various developments have been made so far on a technique for modifying the flame retardancy of resin materials. For example, the technique described in Patent Document 1 is known as such a kind of technique. Patent Document 1 describes a technique in which a polyphosphate of a triazine compound as a flame retardant component is added to a resin material (claim 1 and the like of Patent Document 1).

RELATED DOCUMENT

Patent Document

[Patent Document 1] Japanese Unexamined Patent Publication No. 2011-174095

SUMMARY OF THE INVENTION

However, as a result of the studies by the present inventors, it was found that there is room for improvement in the flame retardant composition described in Patent Document 1 in terms of flame retardancy, weather-resistant colorability, and thermal colorability of a flame-retardant resin composition.

In a process of synthesizing a (poly)phosphate, a metal is inevitably incorporated as one of impurities, from a raw material component and a material constituting a container. As a result of studying such a metal, it was found that the metal contained in the (poly)phosphate affects the coloration of a resin material in a production environment where heat is applied or a usage environment which is irradiated with ultraviolet rays.

Therefore, the present inventors considered to proceed with the studies focusing on the types and content ratios of influential metals in the (poly)phosphate. As a result of the studies, it was found that the weather-resistant colorability and the thermal colorability can be stably evaluated by using an Fe (elemental iron)/Na (elemental sodium) content ratio and an Fe content as indicators.

As a result of further extensive research based on such findings, it has been found that, by setting the Fe/Na content ratio within a predetermined range and then setting the Fe content to a predetermined value or less, it is possible to improve the weather-resistant colorability and thermal colorability in the flame-retardant resin composition while obtaining the flame retardancy thereof. The present invention has been completed based on these findings.

According to the present invention, there is provided a flame retardant composition including a (poly)phosphate, in which F and N satisfy $8.0\times10^{-4}\leq F/N\leq20.0$ and $F\leq21.0$, assuming that F (ppm) is a content of elemental iron and N (ppm) is a content of elemental sodium in the flame retardant composition as measured in accordance with the following procedure.

(Procedure)

The flame retardant composition is used as a sample and mixed with a 1 M nitric acid aqueous solution, and the mixture is stirred at room temperature of 25° C. for 24 hours and then passed through a membrane filter to prepare a measurement solution.

The contents of elemental iron and elemental sodium are measured for the obtained measurement solution by using ICP emission spectroscopic analysis.

Further, according to the present invention, there is provided a flame-retardant resin composition including the above-mentioned flame retardant composition, and a thermoplastic resin.

Further, according to the present invention, there is provided a molded article of the above-mentioned flame-retardant resin composition.

Further, according to the present invention, there is provided a method for producing a molded article including a step of producing the molded article using the above-mentioned flame-retardant resin composition.

According to the present invention, there are provided a flame retardant composition which is capable of improving flame retardancy, weather-resistant colorability, and thermal colorability in a flame-retardant resin composition, as well as a flame-retardant resin composition using the same, a molded article, and a method for producing a molded article.

BRIEF DESCRIPTION OF THE DRAWINGS

FIG. 1 shows a plot diagram plotting Fe and Na contents of Examples and Comparative Examples.

FIG. 2 shows an enlarged view of FIG. 1 in a region with a low concentration of Na.

DESCRIPTION OF EMBODIMENTS

The flame retardant composition of the present embodiment is outlined.

The flame retardant composition is a phosphate-based flame retardant including a (poly)phosphate, in which F and N satisfy $8.0\times10^{-4}\leq F/N\leq20.0$ and $F\leq21.0$, assuming that F (ppm) is a content of elemental iron and N (ppm) is a content of elemental sodium in the flame retardant composition as measured in accordance with the procedure which will be given later.

According to the findings of the present inventors, it has been found that, by utilizing the Fe/Na content ratio and the Fe content as indicators, it is possible to stably evaluate the weather-resistant colorability and thermal colorability in a flame-retardant resin composition including a flame retardant composition; and that, by setting the Fe/Na content ratio within the above-mentioned range and then setting the Fe content to the above-mentioned upper limit value or less, it is possible to improve the flame retardancy, weather-resistant colorability, and thermal colorability in the flame-retardant resin composition.

The upper limit of F/N in the flame retardant composition is 20.0 or less, preferably 19.0 or less, and more preferably 18.0 or less. This makes it possible to improve the weather-resistant colorability of the flame-retardant resin composition. On the other hand, the lower limit of F/N is $8.0\times10^{-4}$ or more, preferably $9.0\times10^{-4}$ or more, and more preferably $1.0\times10^{-3}$ or more. This makes it possible to improve the thermal colorability of the flame-retardant resin composition. In addition, by setting the value of F/N within such a numerical range, it is possible to improve the flame retardancy of the flame-retardant resin composition.

The upper limit of F in the flame retardant composition is 21.0 or less, preferably 20.5 or less, and more preferably 16.5 or less. This makes it possible to improve the weather-resistant colorability of the flame-retardant resin composition. On the other hand, the lower limit of F is not particularly limited as long as Fe is contained, but may be, for example, 0.5 or more or 1.0 or more. This makes it possible to improve the thermal colorability of the flame-retardant resin composition.

In addition, the upper limit of N in the flame retardant composition is, for example, $5.1 \times 10^3$ or less, preferably $4.2 \times 10^3$ or less, and more preferably $3.0 \times 10^3$ or less. This makes it possible to improve the thermal colorability and flame retardancy of the flame-retardant resin composition. On the other hand, the lower limit of N is not particularly limited as long as Na is contained, but may be, for example, 0.1 or more or 0.5 or more.

An example of the procedure for measuring the content of elemental iron and the content of elemental sodium in the flame retardant composition is as follows.

First, the flame retardant composition is used as a sample and mixed with a 1 M nitric acid aqueous solution, and the mixture is stirred at room temperature of 25° C. for 24 hours and then passed through a membrane filter to prepare a measurement solution. For example, 50 to 100 mL of a 1M nitric acid aqueous solution may be added to 250 to 500 mg of a sample to prepare a measurement solution.

Subsequently, the contents of elemental iron and elemental sodium are measured for the obtained measurement solution by using ICP emission spectroscopic analysis.

A calibration curve is prepared in a range of 0 to 0.5 ppm or 0.5 to 10 ppm for both Fe and Na.

Both calibration curves may be used properly according to the Fe and Na detection intensities of the measurement solution. In a case where the detection intensity is beyond the above-mentioned calibration curve range, the elemental content may be measured by diluting the measurement solution with a 1 M nitric acid aqueous solution to a concentration within the calibration curve range.

In the present embodiment, it is possible to control the F/N ratio, F content, and N content by appropriately selecting, for example, the type and blending amount of each component included in the flame retardant composition, and the method for preparing the flame retardant composition. Above all, for example, the blending conditions of two or more (poly)phosphates; the materials of the instruments and containers to be used, and the adjustment of the raw material components of Fe- and Na-, or Fe/Na-containing compounds and additive components, in the synthesis process of (poly)phosphates and the production process of a flame retardant composition using (poly)phosphates; and appropriate selection of recrystallization, filtration, washing, and other operations are mentioned as factors for setting the F/N ratio, F content, and N content in desired numerical ranges. In addition, if necessary, the synthesis/production environment under an atmosphere of an inert gas such as argon may be adjusted, or a filtering operation using an ion exchange resin or a chelate exchange resin may be carried out.

According to the present embodiment, it is possible to realize a flame retardant composition which is capable of improving the flame retardancy, weather-resistant colorability, and thermal colorability in a flame-retardant resin composition.

The flame retardant composition of the present embodiment will be described in detail.

The flame retardant composition may include at least a pyrophosphate from the group of (poly)phosphates consisting of an orthophosphate, the pyrophosphate, and a polyphosphate having n of 3 or more or r of 3 or more, each of which is represented by General Formula (1) or General Formula (3). These phosphates may be used alone or in combination of two or more thereof.

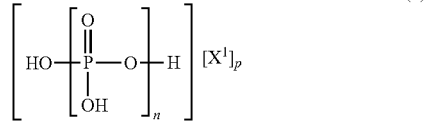

In General Formula (1), n represents a number from 1 to 100, $X^1$ represents ammonia or a triazine derivative represented by General Formula (2), and p is a number that satisfies the relational expression of $0<p \le n+2$.

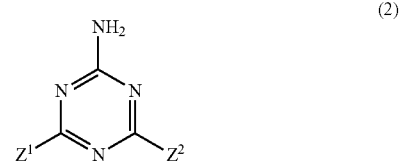

In General Formula (2), $Z^1$ and $Z^2$ may be the same or different from each other and each represent a group selected from the group consisting of a —$NR^5R^6$ group, a hydroxyl group, a mercapto group, a linear or branched alkyl group having 1 to 10 carbon atoms, a linear or branched alkoxy group having 1 to 10 carbon atoms, a phenyl group, and a vinyl group, and $R^5$ and $R^6$ each independently represent a hydrogen atom, a linear or branched alkyl group having 1 to 6 carbon atoms, or a methylol group.

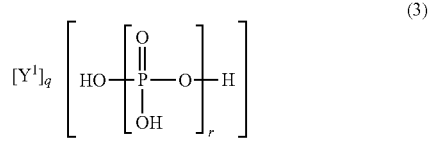

In General Formula (3), r represents a number from 1 to 100, $Y^1$ is $[R^1R^2N(CH_2)_mNR^3R^4]$, piperazine, or a diamine containing a piperazine ring, $R^1$, $R^2$, $R^3$, and $R^4$ are each a hydrogen atom or a linear or branched alkyl group having 1 to 5 carbon atoms, and $R^1$, $R^2$, $R^3$, and $R^4$ may be the same or different from one another, m is an integer of 1 to 10, and q is a number that satisfies the relational expression of $0<q \le r+2$.

In the present specification, the term (poly)phosphoric acid refers to any one of orthophosphoric acid, pyrophosphoric acid, and polyphosphoric acid having a degree of condensation of 3 or more, or a mixture thereof. The (poly)phosphate may contain two or more salts having different degrees of polymerization or two or more different types of salts.

In the present specification, in the (poly)phosphate represented by General Formula (1), a triazine (poly)phosphate is used as a term representing a salt of a (poly)phosphoric acid with a triazine derivative, ammonia, or the like; and in the (poly)phosphate represented by General Formula (3), a piperazine (poly)phosphate is used as a term representing a salt of a (poly)phosphoric acid with piperazine or a diamine containing a piperazine ring or the like.

In General Formula (1), for example, the case where n is 1 refers to an orthophosphate, the case where n is 2 refers to a pyrophosphate, and the case where n is 3 refers to a triphosphate.

In General Formula (3), for example, the case where r is 1 refers to an orthophosphate, the case where r is 2 refers to a pyrophosphate, and the case where r is 3 refers to a triphosphate.

Examples of the linear or branched alkyl group having 1 to 10 carbon atoms represented by $Z^1$ and $Z^2$ in General Formula (2) include methyl, ethyl, propyl, isopropyl, butyl, secondary butyl, tertiary butyl, isobutyl, amyl, isoamyl, tertiary amyl, hexyl, cyclohexyl, heptyl, isoheptyl, tertiary heptyl, n-octyl, isooctyl, tertiary octyl, 2-ethylhexyl, nonyl, and decyl. Examples of the linear or branched alkoxy group having 1 to 10 carbon atoms include groups derived from these alkyl groups. In addition, examples of the linear or branched alkyl group having 1 to 6 carbon atoms represented by $R^5$ and $R^6$ in the —$NR^5R^6$ group that can be taken by $Z^1$ and $Z^2$ include alkyl groups having 1 to 6 carbon atoms among the above-mentioned alkyl groups.

Specific examples of the triazine derivative represented by $X^1$ in General Formula (2) include melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, and 2-amino-4,6-dimercapto-1,3,5-triazine.

The flame retardant composition preferably includes a pyrophosphate (triazine pyrophosphate or ammonium pyrophosphate) represented by General Formula (1). In addition, the flame retardant composition preferably includes a pyrophosphate (melamine pyrophosphate) in which $X^1$ in General Formula (1) is melamine. This makes it possible to stably improve the heat resistance.

Examples of the diamine represented by $Y^1$ in General Formula (3) include $R^1R^2N(CH_2)_mNR^3R^4$, piperazine, and a diamine containing a piperazine ring. $R^1$ to $R^4$ may be the same or different from one another and each represent a linear or branched alkyl group having 1 to 5 carbon atoms.

Examples of the linear or branched alkyl group having 1 to 5 carbon atoms represented by $R^1$ to $R^4$ include linear or branched alkyl groups having 1 to 5 carbon atoms among those listed as specific examples of the alkyl group represented by $Z^1$ and $Z^2$.

Examples of the diamine containing a piperazine ring include compounds in which at least one of the 2-, 3-, 5-, and 6-positions of piperazine is substituted with an alkyl group (which preferably has 1 to 5 carbon atoms); and compounds in which the amino group(s) at the 1- and/or 4-position(s) of piperazine is/are substituted with an alkyl group (which preferably has 1 to 5 carbon atoms).

Specific examples of the diamine represented by $Y^1$ in General Formula (3) include N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-tetraethylethylenediamine, tetramethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, piperazine, trans-2,5-dimethylpiperazine, 1,4-bis(2-aminoethyl)piperazine, and 1,4-bis(3-aminopropyl)piperazine.

The flame retardant composition preferably includes a pyrophosphate (piperazine pyrophosphate) in which $Y^1$ in General Formula (3) is piperazine. This makes it possible to stably improve the heat resistance.

In addition, the flame retardant composition may include both the (poly)phosphate represented by General Formula (1) and the (poly)phosphate represented by General Formula (3).

Above all, the flame retardant composition preferably includes a pyrophosphate (melamine pyrophosphate) in which $X^1$ in General Formula (1) is melamine, and a piperazine (poly)phosphate represented by General Formula (3); and more preferably a pyrophosphate (melamine pyrophosphate) in which $X^1$ in General Formula (1) is melamine and a pyrophosphate (piperazine pyrophosphate) in which $Y^1$ in General Formula (3) is piperazine. This makes it possible to further enhance the flame retardancy. The content ratio of the two phosphates may be appropriately selected.

The flame retardant composition may include either or both of an orthophosphate and a pyrophosphate in addition to the pyrophosphate. This makes it possible to balance various physical properties of the flame retardant composition.

Here, an example of a production process of the (poly)phosphate will be described.

The triazine (poly)phosphate is obtained by reacting a (poly)phosphoric acid or a (poly)phosphate with the triazine derivative. For example, the triazine (poly)phosphate can be obtained by reacting a (poly)phosphoric acid with melamine at a certain reaction ratio thereof, or by adding a sodium (poly)phosphate and melamine, followed by neutralization with hydrochloric acid.

The piperazine (poly)phosphate is obtained by reacting a (poly)phosphoric acid or a (poly)phosphate with the piperazine or the diamine containing a piperazine ring. For example, a (poly)phosphoric acid or a sodium (poly)phosphate can be reacted with piperazine or the diamine containing a piperazine ring in water or an aqueous solution of methanol to obtain the piperazine (poly)phosphate as a poorly water-soluble precipitate.

In the process of synthesizing a (poly)phosphate, known purification treatments such as recrystallization, filtration, decantation, and washing may be carried out, or various treatments may be carried out in an atmosphere of an inert gas such as argon.

In the process of synthesizing a (poly)phosphate alone or in the process of producing a flame retardant composition including a (poly)phosphate, for example, propylene or glass is preferably used as a non-metallic material or SUS may be used as a metallic material, for instruments and containers that come into direct contact therewith.

In this manner, the triazine (poly)phosphate and the piperazine (poly)phosphate can be obtained. These phosphates may be used alone or in combination of two or more thereof. In addition, the flame retardant composition may be obtained by combining and blending two or more compounds with different degrees of condensation or different types of salts in an appropriate ratio.

A flame retardant composition including such a (poly)phosphate can improve the flame retardancy of a resin material.

The lower limit of the content of the (poly)phosphate is, for example, 20% by weight or more, preferably 50% by weight or more, and more preferably 80% by weight or more with respect to 100% by weight of the flame retardant composition. This makes it possible to enhance the flame retardancy of the resin material. In addition, the heat resistance of the flame retardant composition can be improved. On the other hand, the upper limit of the content of the (poly)phosphate is not particularly limited, but may be, for example, 100% by weight or less, 99% by weight or less, or 95% by weight or less with respect to 100% by weight of the flame retardant composition. As a result, it is possible to achieve a balance with the characteristics according to various uses.

For the measurement solution obtained according to the above-mentioned procedure for measuring the contents of elemental iron and sodium, the content of elemental phosphorus in the entire flame retardant composition measured by ICP emission spectroscopic analysis is defined as P0, and the content of elemental phosphorus derived from pyrophosphoric acid in the flame retardant composition measured by anion ion chromatography is defined as P1.

At this time, the lower limit of (P1/P0) in the flame retardant composition is, for example, 0.01 or more, preferably 0.1 or more, and more preferably 0.2 or more. This makes it possible to improve the flame retardancy. On the other hand, the upper limit of (P1/P0) is not particularly limited, but may be 1 or less, 0.99 or less, or 0.95 or less. This makes it possible to balance various physical properties of the flame retardant composition.

In addition, an example of the flame retardant composition may be a composition satisfying (P1/P0) of 0.2 or more and 0.4 or less, a composition satisfying (P1/P0) of 0.4 or more and 0.5 or less, a composition satisfying (P1/P0) of 0.5 or more and 0.7 or less, or a composition satisfying (P1/P0) of 0.7 or more and 0.99 or less.

<Method of Calculating Content Ratio (P1/P0) of Elemental Phosphorus Derived from Pyrophosphoric Acid>

The content ratio (P1/P0) of elemental phosphorus derived from pyrophosphoric acid in the flame retardant composition can be obtained using P1 and P0 calculated based on the following procedure.

(P0: Content of Elemental Phosphorus in Flame Retardant Composition)

In the same manner as in the measurement of Fe and Na contents, the content of elemental phosphorus in the flame retardant composition is measured by ICP emission spectroscopic analysis, and the obtained measured value is defined as P0.

(P1: Content of Elemental Phosphorus Derived from Pyrophosphoric Acid in Flame Retardant Composition)

The content of pyrophosphoric acid in the flame retardant composition is quantified by anion chromatography based on the following measurement conditions, and P1 is calculated using the thus-obtained [quantitative value of pyrophosphoric acid].

$$P1 = [\text{quantitative value of pyrophosphoric acid}] \times (30.97 \times 2)/177.972$$

(30.97: atomic weight of elemental phosphorus, 177.972: molecular weight of pyrophosphoric acid ($H_4P_2O_7$))

<Measurement Conditions for Anion Ion Chromatography>

(Measurement Conditions)

Measuring device: ion chromatograph ICS-2100 (available from Thermo Fisher Scientific Inc.)

Column: Dionex IonPac AS-19 (available from Thermo Fisher Scientific Inc.)

Detector: electrical conductivity detector

Elution conditions: 1.0 mmol/L potassium hydroxide aqueous solution (0 minutes)→60.0 mmol/L potassium hydroxide aqueous solution (42 minutes). The concentration of the potassium hydroxide aqueous solution (eluent) is changed as follows.

From 0 to 1 minute: gradient from 1.0 mmol/L to 10.0 mmol/L.

From more than 1 minute to 10 minutes: constant at 10.0 mmol/L.

From more than 10 minutes to 15 minutes: gradient from 10.0 mmol/L to 60.0 mmol/L.

From more than 15 minutes to 42 minutes: constant at 60.0 mmol/L.

Flow rate: 1.0 mL/min

Sample injection volume: 25 μL

Column temperature: 35° C.

(Standard Substance)

Sodium pyrophosphate decahydrate, manufactured by FUJIFILM Wako Pure Chemical Corporation.

(Preparation of Solution for Measurement)

500 mL of ultrapure water, 500 to 1000 mg of a sample of flame retardant composition, and 1.9 g of potassium hydroxide are placed and dissolved in a 1 L measuring flask, and then ultrapure water is added up to a marked line to prepare a 1 L solution. The solution is passed through a membrane filter to remove insoluble matter and used for measurement. In addition, a calibration curve in a range of 0 to 500 ppm in terms of pyrophosphoric acid is prepared using a standard substance, and the content of pyrophosphoric acid in the flame retardant composition is calculated.

It is preferable to adjust the concentration of pyrophosphate such that 200 to 500 ppm in terms of pyrophosphoric acid is contained, and the amount of sample to be used may be adjusted as appropriate.

In addition, the flame retardant composition may include an additive such as an aid, a surface treatment agent, or a dust suppressant, if necessary, as long as the effects of the invention are not impaired.

The content of the additive in the flame retardant composition is, for example, 0.001 to 15 parts by weight, preferably 0.005 to 10 parts by weight, and more preferably 0.01 to 5 parts by weight with respect to 100 parts by weight of the (poly)phosphate. The effect of the additive can be improved by setting the content of the additive in such a numerical range.

The flame retardant composition can be obtained by mixing the (poly)phosphate with the additive. As a method of mixing, a commonly used known method can be applied as it is.

The flame retardant composition may include an aid. Examples of the aid include a flame retardant aid, an anti-drip aid, and a processing aid.

The flame retardant aid can contain a metal oxide or a polyhydric alcohol compound. This makes it possible to improve the flame retardancy of the resin.

Examples of the metal oxide include titanium oxide, zinc oxide, calcium oxide, magnesium oxide, calcium oxide, zirconium oxide, barium oxide, tin dioxide, lead dioxide, antimony oxide, molybdenum oxide, and cadmium oxide. Among these metal oxide compounds, zinc oxide, titanium oxide, magnesium oxide, and silicon oxide can be used. These metal oxide compounds may be used alone or in combination of two or more thereof. This makes it possible to improve the flame retardancy of the resin. In addition, it is possible to suppress the occurrence of aggregation in a powdery-granular flame retardant composition. Zinc oxide is preferable from the viewpoint of flame retardancy.

The zinc oxide may or may not be surface-treated.

A commercially available product may be used as the zinc oxide. Examples thereof include Zinc Oxide Grade 1 (manufactured by Mitsui Mining & Smelting Co., Ltd.), partially coated zinc oxide (manufactured by Mitsui Mining & Smelting Co., Ltd.), NANOFINE 50 (ultrafine particulate zinc oxide having an average particle size of 0.02 μm, manufactured by Sakai Chemical Industry Co., Ltd.), and NANOFINE K (ultrafine particulate zinc oxide having an average particle size of 0.02 μm and coated with zinc silicate; manufactured by Sakai Chemical Industry Co., Ltd.).

The polyhydric alcohol is a compound in which a plurality of hydroxyl groups are bonded, examples of which include pentaerythritol, dipentaerythritol, tripentaerythritol, polypentaerythritol, neopentyl glycol, trimethylolpropane, ditrimethylolpropane, 1,3,5-tris(2-hydroxyethyl)isocyanurate (THEIC), polyethylene glycol, glycerin, diglycerin, mannitol, maltitol, lactitol, sorbitol, erythritol, xylitol, xylose, sucrose, trehalose, inositol, fructose, maltose, and lactose. Among these polyhydric alcohol compounds, one or more selected from the group of pentaerythritol and a pentaerythritol condensate such as pentaerythritol, dipentaerythritol, tripentaerythritol and polypentaerythritol are preferable; dipentaerythritol and a pentaerythritol condensate are particularly preferable; and dipentaerythritol is most preferable. In addition, THEIC and sorbitol can also be suitably used. These polyhydric alcohol compounds may be used alone or in combination of two or more thereof.

Examples of the anti-drip aid include a layered silicate, a fluorine-based anti-drip aid, and a silicone rubber. The incorporation of the anti-drip aid makes it possible to suppress dripping during the combustion of the resin.

The layered silicate may be either natural or synthetic and is not particularly limited.

Examples of the layered silicate include smectite clay minerals such as montmorillonite, saponite, hectorite, beidellite, stevensite, and nontronite; as well as vermiculite, halloysite, swelling mica, and talc. These layered silicates may be used alone or in combination of two or more thereof.

Among these layered silicates, saponite or talc is preferable from the viewpoint of prevention of dripping; and talc is particularly preferable from the viewpoint of economic efficiency such as price.

The layered silicate is a layered silicate mineral and may have a cation between the layers thereof.

The cation may be a metal ion, or a part or all of the cation may be a cation other than the metal ion, such as an organic cation, a (quaternary) ammonium cation, or a phosphonium cation.

Examples of the metal ion include a sodium ion, a potassium ion, a calcium ion, a magnesium ion, a lithium ion, a nickel ion, a copper ion, and a zinc ion.

Examples of the organic cation or quaternary ammonium cation include a lauryltrimethylammonium cation, a stearyltrimethylammonium cation, a trioctylmethylammonium cation, a distearyldimethylammonium cation, a di-hardened beef tallow-dimethylammonium cation, and a distearyldibenzylammonium cation. These cations may be used alone or in combination of two or more thereof.

Specific examples of the fluorine-based anti-drip aid include fluorine-based resins such as polytetrafluoroethylene, polyvinylidene fluoride, and polyhexafluoropropylene; and alkali metal or alkaline earth metal salts of perfluoroalkanesulfonic acids, such as sodium perfluoromethanesulfonate, potassium perfluoro-n-butanesulfonate, potassium perfluoro-t-butanesulfonate, sodium perfluorooctanesulfonate, and calcium perfluoro-2-ethylhexanesulfonate. Above all, polytetrafluoroethylene may be used from the viewpoint of prevention of dripping. These fluorine-based anti-drip aids may be used alone or in combination of two or more thereof.

The processing aid can be appropriately selected from known processing aids, but may include an acrylic acid-based processing aid.

Examples of the acrylic acid-based processing aid include a homopolymer or copolymer of an alkyl methacrylate such as methyl methacrylate, ethyl methacrylate, or butyl methacrylate; a copolymer of the alkyl methacrylate with an alkyl acrylate such as methyl acrylate, ethyl acrylate, or butyl acrylate; a copolymer of the alkyl methacrylate with an aromatic vinyl compound such as styrene, α-methylstyrene, or vinyltoluene; and a copolymer of the alkyl methacrylate with a vinyl cyan compound such as acrylonitrile or methacrylonitrile. These processing aids may be used alone or in combination of two or more thereof.

The flame retardant composition may include a surface treatment agent.

Examples of the surface treatment agent include a silicone oil and a silane coupling agent.

By using the silicone oil, the dispersibility of the flame retardant composition in the resin can be enhanced. In addition, water resistance can be improved.

The silicone oil can be used without particular limitation as long as it is a known silicone oil having a polysiloxane skeleton. The silicone oil may be a polymer having a linear polysiloxane skeleton, in which the side chains of polysiloxane may be all methyl groups, a part of the side chains of polysiloxane may have a phenyl group, or a part of the side chains of polysiloxane may have hydrogen. These silicone oils may be partially modified by epoxy modification, amino modification, carboxy modification, or the like. These silicone oils may be used alone or in combination of two or more thereof.

Examples of the method for adding the surface treatment agent include a method in which a powdery-granular flame retardant composition is mixed with a surface treatment agent; and a method in which a surface treatment agent is spray-dried to be added to and mixed with a powdery-granular flame retardant composition. In addition, the surface treatment agent may be added to the flame retardant composition by surface-treating a part of the components constituting the flame retardant composition.

Examples of the silane coupling agent include silane coupling agents having an alkenyl group such as vinyltrimethoxysilane, vinyltriethoxysilane, vinyltriacetoxysilane, vinyl tris(2-methoxyethoxy)silane, vinylmethyldimethoxysilane, octenyltrimethoxysilane, allyltrimethoxysilane, and p-styryltrimethoxysilane; silane coupling agents having an acrylic group such as 3-acryloxypropyltrimethoxysilane and 3-acryloxypropyltriethoxysilane; silane coupling agents having a methacrylic group such as 3-methacryloxypropylmethyldimethoxysilane, 3-methacryloxypropyltrimethoxysilane, 3-methacyloxypropylmethyldiethoxysilane, 3-methacryloxypropyltriethoxysilane, and methacryloxyoctyltrimethoxysilane; silane coupling agents having an epoxy group such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and glycidoxyoctyltrimethoxysilane; silane coupling agents having an amino group such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl N-(1,3-dimethyl-butylidene)propylamine, N-phenyl-3-aminopropyltrimethoxysilane, N,N'-bis[3-(trimethoxysilyl)propyl]ethylenediamine, and a hydrochloride of N-(vinylbenzyl)-2-aminoethyl-3-aminopropyltrimethoxysilane; silane coupling agents having an isocyanurate group such as tris-(trimethoxysilylpropyl)isocyanurate; silane coupling agents having a mercapto group such as 3-mercaptopropylmethyldimethoxysilane, 3-mercaptopropyltrimethoxysilane, and 3-mercaptopropyltriethoxysilane; silane coupling agents having an ureido group such as 3-ureidopropyltrimethoxysilane and 3-ureidopropyltriethoxysilane; silane coupling agents having a sulfide group such as bis(triethoxysilylpropyl)tetrasulfide; silane coupling agents having a thioester group such as 3-octanoylthio-1-propyltriethoxysilane; and silane coupling agents having an isocyanate group such as 3-isocyanatopropyltriethoxysilane and 3-isocyanatopropyltrimethoxysilane. These silane coupling agents may be used alone or in combination of two or more thereof.

From the viewpoint of flame retardancy, handleability, prevention of aggregation of flame retardant powder, and improvement of storage stability, among these silane coupling agents, a silane coupling agent having an epoxy group is preferable; and 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, or glycidoxyoctyltrimethoxysilane is more preferable.

The flame retardant composition may include a dust suppressant.

Examples of the dust suppressant include an aliphatic dicarboxylic acid ether ester compound and the above-mentioned silane coupling agent.

The aliphatic dicarboxylic acid ether ester compound may include a compound represented by General Formula (4) which will be given later. This makes it possible to suppress the dustiness of the powdery-granular flame retardant composition. These dust suppressants may be used alone or in combination of two or more thereof.

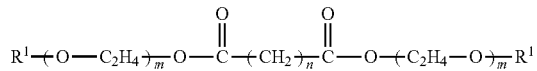

(4)

In General Formula (4), n represents an integer of 2 to 6, m represents an integer of 1 to 3, and $R^1$ represents an alkyl group having 1 to 6 carbon atoms.

In General Formula (4), the alkyl group having 1 to 6 carbon atoms may be a linear alkyl group or a branched alkyl group, examples of which include a methyl group, an ethyl group, a propyl group, an isopropyl group, a butyl group, an isobutyl group, a secondary butyl group, a tertiary butyl group, an amyl group, an isoamyl group, a tertiary amyl group, and a hexyl group. $R^1$ is preferably a butyl group from the viewpoint of flame retardancy and particularly handleability and storage stability.

In General Formula (4), n is preferably 4 from the viewpoint of flame retardancy and particularly handleability and storage stability. In addition, in General Formula (4), m is preferably 2 from the viewpoint of flame retardancy and particularly handleability and storage stability.

The flame retardant composition may include other components as long as the effects of the present invention are not impaired.

Additives commonly used for modifying thermoplastic resins can be used as other components, and examples thereof include an antioxidant, a light stabilizer, an ultraviolet absorber, a lubricant, another flame retardant/flame retardant aid, a reinforcing material, a crystal nucleating agent, a clarifying agent, a cross-linking agent, an antistatic agent, a metal soap, a filler, an antifogging agent, an anti-plate out agent, a fluorescent agent, a mildew-proofing agent, a bactericide, a foaming agent, a metal deactivator, a mold release agent, and a pigment. These other components may be used alone or in combination of two or more thereof.

One or two or more of the above-mentioned aid, surface treatment agent, dust suppressant, and other components may be blended in the above-mentioned flame retardant composition, but may be blended in a flame-retardant resin composition including a flame retardant composition and a thermoplastic resin.

Next, the flame-retardant resin composition of the present embodiment will be described.

The flame-retardant resin composition includes the above-mentioned flame retardant composition and a thermoplastic resin.

The content of the flame retardant composition can be usually in a range of 10 to 400 parts by weight, preferably 15 to 200 parts by weight, and more preferably 20 to 70 parts by weight with respect to 100 parts by weight of the thermoplastic resin. This makes it possible to sufficiently obtain a modifying effect of the thermoplastic resin.

In the present specification, the term "to" is intended to include an upper limit value and a lower limit value, unless otherwise specified.

Examples of the thermoplastic resin include synthetic resins such as a polyolefin-based resin, a styrene-based resin, a polyester-based resin, a polyether-based resin, a polycarbonate-based resin, a polyamide-based resin, and a halogen-containing resin. Among these resins, a polyolefin-based resin may be used. These resins may be used alone or in combination of two or more thereof.

Further examples of the thermoplastic resin that can be used include thermoplastic resins such as a petroleum resin, a coumarone resin, a polyvinyl acetate, an acrylic resin, a polymethyl methacrylate, a polyvinyl alcohol, a polyvinyl formal, a polyvinyl butyral, a polyphenylene sulfide, a polyurethane, a fibrous resin, a polyimide resin, a polysulfone, and a liquid crystal polymer, as well as blends thereof.

In addition, the thermoplastic resin may be a thermoplastic elastomer such as an isoprene rubber, a butadiene rubber, an acrylonitrile-butadiene copolymer rubber, a styrene-butadiene copolymer rubber, a polyester-based elastomer, a nitrile-based elastomer, a nylon-based elastomer, a vinyl chloride-based elastomer, a polyamide-based elastomer, or a polyurethane-based elastomer, which may be used in combination.

Specific examples of the thermoplastic resin include, but are not particularly limited to, polyolefin-based polymers, for example, α-olefin polymers such as polypropylene, high-density polyethylene, low-density polyethylene, linear low-density polyethylene, polybutene-1, poly(3-methylpentene), poly(4-methylpentene), and ethylene/propylene block or random copolymer; thermoplastic linear polyester-based polymers such as polyethylene terephthalate, polybutylene terephthalate, and polyhexamethylene terephthalate; polysulfide-based polymers such as polyphenylene sulfide; polylactic acid-based polymers such as polycaprolactone; linear polyamide-based polymers such as polyhexamethylene adipamide; and crystalline polystyrene-based polymers such as syndiotactic polystyrene.

The flame-retardant resin composition may include one or more selected from additives consisting of the above-mentioned aid, surface treatment agent, dust suppressant, and other components, if necessary, in addition to the flame retardant composition. These additives may be used alone or in combination of two or more thereof.

The content of the additive in the flame-retardant resin composition is, for example, 0.001 to 15 parts by weight, preferably 0.005 to 10 parts by weight, and more preferably 0.01 to 5 parts by weight with respect to 100 parts by weight of the thermoplastic resin. The effect of the additive can be improved by setting the content of the additive in such a numerical range.

Next, a method for producing the flame-retardant resin composition will be described.

The flame-retardant resin composition can be obtained by mixing the above-mentioned flame retardant composition and thermoplastic resin. If necessary, the above-mentioned additives may be mixed therewith. The additives may be mixed in the flame retardant composition or may be mixed in the mixture of the flame retardant composition and the thermoplastic resin.

As a method of mixing, a commonly used known method can be applied as it is. For example, a kneader is used to mix the flame retardant composition, the thermoplastic resin and, if necessary, the additives. Examples of mixing equipment include a tumbler mixer, a Henschel mixer, a ribbon blender, a V-type mixer, a W-type mixer, a super mixer, and a Nauta mixer.

The flame-retardant resin composition can be used in various forms, and may be, for example, in the form of pellets, granules, or powder. From the viewpoint of handleability, the flame-retardant resin composition is preferably in the form of pellets.

Next, a molded article can be produced by molding using the flame-retardant resin composition. That is, according to the present embodiment, it is possible to provide a method for producing a molded article using a flame-retardant resin composition and a molded article obtained by the production method.

Examples of the molding method include, but are not particularly limited to, injection molding, extrusion molding, blow molding, rotary molding, vacuum molding, inflation molding, calendar molding, slash molding, dip molding, and foam molding. Among these molding methods, injection molding, extrusion molding, and blow molding are preferable.

As a result, it is possible to produce molded bodies having various types of shapes such as a resin plate, a sheet, a film, and an irregular shape article.

The molded article made of the flame-retardant resin composition can be used for various purposes, such as electric/electronic parts, machinery parts, optical instruments, building components, automobile parts, and daily necessities. Above all, from the viewpoint of flame retardancy, such a molded article can be suitably used for electric/electronic parts.

The flame-retardant resin composition and a molded body formed therefrom can be used in a wide variety of industrial fields such as the fields of electricity, electronics, and communication, agriculture, forestry and fisheries, mining, construction, food, textiles, clothing, medical care, coal, petroleum, rubber, leather, automobiles, precision equipment, wood, construction material, civil engineering, furniture, printing, and musical instruments. Specifically, a flame-retardant synthetic resin composition of the present invention and a molded body formed therefrom can be used for a printer, a personal computer, a word processor, a keyboard, a PDA (small information terminal), a telephone, a copy machine, a facsimile, an electronic cash register (ECR), a desk calculator, an electronic notepad, an electronic card, a holder, stationery, other stationary supplies, OA equipment, a washing machine, a refrigerator, a vacuum cleaner, a microwave oven, a lighting apparatus, a gaming console, a clothes iron, kotatsu (a Japanese table with an electric heater), other household appliances, a TV set, a VTR, a video camera, a radio-cassette recorder, a tape recorder, a minidisk, a CD player, a speaker, a liquid crystal display, audio-visual equipment, a connector, a relay, a condenser, a switch, a printed circuit board, a coil bobbin, a semiconductor sealing material, an LED sealing material, an electric wire, a cable, a transformer, a deflecting yoke, a power distribution board, a clock, electric and electronic parts, and communication equipment.

The flame-retardant resin composition and a molded body formed therefrom can be used in various types of applications including: materials for use in automobiles, vehicles, ships, aircraft, buildings, and houses such as seats (fillings, outer materials, and the like), belts, ceiling coverings, convertible tops, armrests, door trims, rear package trays, carpets, mats, sun visors, wheel covers, mattress covers, air bags, insulating materials, hand holding rings, hand holding straps, electric wire covering materials, electric insulating materials, paints, coating materials, upholstery materials, floor materials, corner walls, carpets, wallpaper, wall covering materials, exterior materials, interior materials, roofing materials, decking materials, wall materials, pillar materials, deckings, fence materials, frameworks, moldings, windows, door profiles, shingles, panels, terraces, balconies, noise insulation boards, heat insulation boards, and window materials; building materials and civil engineering materials; and housewares and sporting goods such as clothes, curtains, bed sheets, plywood boards, synthetic fiber boards, rugs, doormats, sheets, buckets, hoses, containers, glasses, bags, cases, goggles, ski plates, rackets, tents, and musical instruments.

Although the embodiments of the present invention have been described hereinbefore, those embodiments are only illustrative for the present invention and various configurations other than the foregoing embodiments can be adopted. Further, it should be noted that the present invention is not limited to the foregoing embodiments, and modifications, improvements, and the like within the range in which the object of the present invention can be achieved are also encompassed by the present invention.

EXAMPLES

Hereinafter, the present invention will be described in detail with reference to Examples, but the present invention is not limited thereto.

<Synthesis and Preparation of (poly)phosphate>

(Synthesis of (poly)phosphate P1)

100.0 g (1.16 mol) of anhydrous piperazine and 450 mL of water were placed in a 1 L polypropylene Erlenmeyer flask, and 267.8 g (2.32 mol) of an 85% phosphoric acid aqueous solution was added dropwise thereto over 1 hour, followed by stirring at 70° C. for 30 minutes and cooling. The precipitated crystals were recovered by filtration and dried under vacuum at 100° C. for 8 hours to obtain 213.3 g of colorless crystals. 3 g of the obtained crystals were placed in a glass test tube, and the inside of the test tube was made into an argon atmosphere. The test tube was placed in an aluminum block bath heated to 250° C. with argon flowing and heated for 150 minutes. This was followed by cooling to give piperazine (poly)phosphate (P1).

(Synthesis of (poly)phosphate P2)

100.0 g (1.16 mol) of anhydrous piperazine and 450 mL of water were placed in a 1.4 L stainless steel (SUS304) container, and 267.8 g (2.32 mol) of an 85% phosphoric acid aqueous solution was added dropwise thereto over 1 hour, followed by stirring at 70° C. for 35 hours. At that time, in order to prevent the water from evaporating and becoming incapable of stirring, water was appropriately added such that an amount of water was about 500 mL, and a state in which stirring was possible was maintained. After cooling, the precipitated crystals were recovered by filtration and dried under vacuum at 100° C. for 6 hours to obtain 245.1 g of colorless crystals. 30 g of the obtained crystals were placed in a 150 mL stainless steel (SUS304) container, and the inside of the container was made into an argon atmosphere. The container was placed in an aluminum block bath heated to 260° C. with argon flowing and heated for 180 minutes. This was followed by cooling to give piperazine (poly)phosphate (P2).

(Synthesis of (poly)phosphate P3)

117.6 g (0.44 mol) of sodium pyrophosphate (manufactured by Kanto Chemical Co., Inc.) and 76.2 g (0.88 mol) of anhydrous piperazine were placed in a 1 L five-necked flask, and then dissolved by adding 600 mL of water. While cooling in a water bath, 184.3 g (1.77 mol) of 35% hydrochloric acid was added dropwise thereto, followed by stirring for 3 hours. The reaction mixture was transferred to a 3 L beaker, 1000 mL of water was added thereto, followed by stirring for 1 hour and allowing to stand for 1.5 hours, and the supernatant was removed by decantation. 300 mL of water was added thereto again, followed by stirring and allowing to stand, and the supernatant was removed by decantation. 480 g of methanol and 300 g of water were added thereto, followed by stirring, and the solid was recovered by filtration. The recovered solid was washed with a mixed solution of 400 g of methanol and 200 g of water, then washed with 300 mL of methanol, and dried at 100° C. under vacuum for 8 hours to obtain 136.4 g of piperazine (poly)phosphate (P3).

(Synthesis of (poly)phosphate P4>

100.0 g (1.16 mol) of anhydrous piperazine, 0.2 g of iron (III) phosphate n-hydrate (manufactured by FUJIFILM Wako Pure Chemical Corporation), and 450 mL of water were placed in a 1 L five-necked flask and heated to 50° C. 267.8 g (2.32 mol) of an 85% phosphoric acid aqueous solution was added dropwise thereto over 1 hour, followed by stirring at 70° C. for 30 minutes and cooling. The precipitated crystals were recovered by filtration and dried under vacuum at 100° C. for 8 hours to obtain 187.0 g of colorless crystals. 3 g of the obtained crystals were placed in a glass test tube, and the inside of the test tube was made into an argon atmosphere. The test tube was placed in an aluminum block bath heated to 250° C. with argon flowing and heated for 150 minutes. This was followed by cooling to give piperazine (poly)phosphate (P4).

(Synthesis of (poly)phosphate P5)

Piperazine (poly)phosphate (P5) was synthesized and obtained in the same manner as the synthesis of (poly)phosphate P4, except that the colorless crystals of the intermediate obtained in (Synthesis of (poly)phosphate P4) were washed with 300 mL of water.

(Synthesis of (poly)phosphate M1)

1.2 g of monomelamine orthophosphate synthesized in the same manner as in (Synthesis of (poly)phosphate P1) was placed in a glass test tube, and the inside of the test tube was made into an argon atmosphere. The test tube was placed in an aluminum block bath heated to 230° C. with argon flowing and heated for 120 minutes to obtain a white solid. 180 g of the white solid thus synthesized was washed with 720 mL of ultrapure water, filtered using a stainless steel funnel, and dried under vacuum at 100° C. for 8 hours to obtain melamine (poly)phosphate (M1).

(Synthesis of (poly)phosphate M2)

Melamine (poly)phosphate (M2) was synthesized and obtained in the same manner as in (Synthesis of (poly)phosphate M1), except that a glass funnel was used.

(Synthesis of (poly)phosphate M3)

66.6 g (0.25 mol) of sodium pyrophosphate (manufactured by Kanto Chemical Co., Inc.), 63.2 g (0.50 mol) of melamine, and 600 mL of water were added to a 1 L five-necked flask. 104.4 g (1.00 mol) of 35% hydrochloric acid was added dropwise thereto over 1 hour, followed by stirring at 90° C. to 100° C. for 1 hour. The reaction solution was filtered, and the solid was washed with 100 mL of water and dried under vacuum at 100° C. for 8 hours to obtain 91.3 g of melamine (poly)phosphate (M3).

(Preparation of (poly)phosphate M4)

PMP-100 (melamine polyphosphate, manufactured by Nissan Chemical Corporation) was used as the melamine (poly)phosphate (M4).

(Synthesis of (poly)phosphate M5)

Melamine (poly)phosphate (M5) was synthesized and obtained in the same manner as in (Synthesis of (poly)phosphate M1), except that 75% phosphoric acid was used and the aluminum block bath heated product was not washed with water.

<Preparation of Flame Retardant Composition>

Each of the obtained (poly)phosphates P1 to P5, M1 to M5, and, if necessary, iron (III) phosphate dihydrate (manufactured by Sigma-Aldrich LLC), sodium pyrophosphate (manufactured by Kanto Chemical Co., Inc.), and sodium hydroxide were mixed at the blending ratios (% by weight) shown in Table 1 below to obtain flame retardant compositions (samples 1 to 25).

TABLE 1

| | | | Unit | Example 1 | Example 2 | Example 3 | Example 4 | Example 5 | Example 6 | Example 7 | Example 8 | Example 9 |
|---|---|---|---|---|---|---|---|---|---|---|---|---|
| Sample | | | | 1 | 2 | 3 | 4 | 5 | 6 | 7 | 8 | 9 |
| Flame retardant composition | Piperazine (poly)phosphate | P1 | % by weight | 60 | | 60 | | 10 | 47 | 15 | 45 | 38 |
| | | P2 | | | 60 | | 55 | 20 | 10 | | | |
| | | P3 | | | | | | 30 | | 45 | 15 | 7 |
| | | P4 | | | | | 5 | | 3 | | | 15 |
| | | P5 | | | | | | | | | | |

TABLE 1-continued

|  |  |  |  |  |  |  |  |  |  |  |  |
|---|---|---|---|---|---|---|---|---|---|---|---|
|  | Melamine (poly)phosphate | M1 |  |  | 40 |  | 40 | 30 |  | 40 | 40 | 40 |
|  |  | M2 |  | 40 |  | 40 |  |  | 40 |  |  |  |
|  |  | M3 |  |  |  |  |  | 10 |  |  |  |  |
|  |  | M4 |  |  |  |  | 40 |  |  |  |  |  |
|  |  | M5 |  |  |  |  |  |  |  |  |  |  |
|  | Iron (III) phosphate dihydrate |  |  |  |  |  |  |  |  | 0.003 |  |  |
|  | Sodium pyrophosphate |  |  |  |  |  |  |  |  |  |  |  |
|  | Sodium hydroxide |  |  |  |  |  |  |  |  |  |  |  |
|  | Total |  |  | 100 | 100 | 100 | 100 | 100 | 100 | 100.003 | 100 | 100 |
|  | Content (F) of elemental iron (Fe) | ppm |  | 1.3 | 5.5 | 1.2 | 8.5 | 3.0 | 3.9 | 10.8 | 1.6 | 11.5 |
|  | Content (N) of elemental sodium (Na) | ppm |  | 1.4 | 0.5 | 16.9 | 0.6 | 2852.9 | 1.3 | 4148.8 | 1383.8 | 646.6 |
|  | F/N |  |  | 0.94 | 11.83 | 0.072 | 14.58 | 0.0010 | 3.0667 | 0.0026 | 0.0012 | 0.0178 |
| Flame-retardant resin composition | Weather-resistant colorability (Δb* at 120 h) |  |  | 2.17 | 0.70 | 4.36 | 1.22 | 3.03 | 2.05 | 3.92 | 2.01 | 3.92 |
|  | Weather-resistant colorability (Δb* < 7) |  |  | A | A | A | A | A | A | A | A | A |
|  | Thermal colorability (Δb* at 68 h) |  |  | 8.40 | 5.77 | 5.35 | 6.37 | 8.97 | 8.77 | 7.93 | 6.79 | 7.38 |
|  | Thermal colorability (Δb* < 9) |  |  | A | A | A | A | A | A | A | A | A |
|  | UL-94V (1.6 mm in thickness, 30% flame retardant added) |  |  | V-0 | V-0 | V-0 | V-0 | V-0 | V-0 | V-0 | V-0 | V-0 |
|  | Comprehensive determination |  |  | A | A | A | A | A | A | A | A | A |

|  |  |  |  | Unit | Example 10 | Example 11 | Example 12 | Example 13 | Example 14 | Example 15 | Example 16 | Example 17 |
|---|---|---|---|---|---|---|---|---|---|---|---|---|
|  | Sample |  |  |  | 10 | 11 | 12 | 13 | 14 | 15 | 16 | 17 |
| Flame retardant composition | Piperazine (poly)phosphate | P1 | % by weight | 10 |  |  | 30 | 40 | 65 | 60 | 80 |
|  |  | P2 |  |  |  | 35 | 40 | 20 |  |  | 10 |  |
|  |  | P3 |  |  | 25 |  |  |  | 10 |  |  |  |
|  |  | P4 |  |  | 25 | 25 | 20 |  |  | 5 |  |  |
|  |  | P5 |  |  |  |  |  |  |  |  |  |  |
|  | Melamine (poly)phosphate | M1 |  |  | 40 | 10 |  | 50 | 50 |  | 15 | 20 |
|  |  | M2 |  |  |  |  |  |  |  |  |  |  |
|  |  | M3 |  |  |  |  |  |  |  |  |  |  |
|  |  | M4 |  |  |  |  |  |  |  |  | 30 | 15 |
|  |  | M5 |  |  |  | 30 | 40 |  |  |  |  |  |
|  | Iron (III) phosphate dihydrate |  |  |  |  |  |  |  |  |  |  |  |
|  | Sodium pyrophosphate |  |  |  |  |  |  |  |  |  |  |  |
|  | Sodium hydroxide |  |  |  |  |  |  |  |  |  |  |  |
|  | Total |  |  |  | 100 | 100 | 100 | 100 | 100 | 100 | 100 | 100 |
|  | Content (F) of elemental iron (Fe) |  | ppm |  | 18.3 | 20.2 | 17.1 | 2.9 | 1.7 | 4.5 | 2.0 | 1.4 |
|  | Content (N) of elemental sodium (Na) |  | ppm |  | 2305.8 | 1.1 | 1.0 | 0.8 | 922.8 | 13.2 | 7.1 | 1.6 |
|  | F/N |  |  |  | 0.0079 | 17.95 | 16.61 | 3.58 | 0.0018 | 0.34 | 0.28 | 0.87 |
| Flame-retardant resin composition | Weather-resistant colorability (Δb* at 120 h) |  |  |  | 6.71 | 6.06 | 6.15 | 1.40 | 1.98 | 3.04 | 2.86 | 2.90 |
|  | Weather-resistant colorability (Δb* < 7) |  |  |  | B | B | B | A | A | A | A | A |
|  | Thermal colorability (Δb* at 68 h) |  |  |  | 7.38 | 5.45 | 5.61 | 6.26 | 6.70 | 5.53 | 5.69 | 5.42 |
|  | Thermal colorability (Δb* < 9) |  |  |  | A | A | A | A | A | A | A | A |
|  | UL-94V (1.6 mm in thickness, 30% flame retardant added) |  |  |  | V-0 | V-0 | V-0 | V-0 | V-0 | V-0 | V-0 | V-0 |
|  | Comprehensive determination |  |  |  | A | A | A | A | A | A | A | A |

TABLE 1-continued

| | | | Unit | Comparative Example 1 | Comparative Example 2 | Comparative Example 3 | Comparative Example 4 |
|---|---|---|---|---|---|---|---|
| Sample | | | | 18 | 19 | 20 | 21 |
| Flame retardant composition | Piperazine (poly)phosphate | P1 | % by weight | | | | |
| | | P2 | | | 20 | | |
| | | P3 | | 57 | 10 | 25 | |
| | | P4 | | 3 | 30 | 35 | |
| | | P5 | | | | | 60 |
| | Melamine (poly)phosphate | M1 | | | | | 40 |
| | | M2 | | | | | |
| | | M3 | | | 40 | 30 | |
| | | M4 | | | | | |
| | | M5 | | 40 | | 10 | |
| | Iron (III) phosphate dihydrate | | | | | | |
| | Sodium pyrophosphate | | | | | | |
| | Sodium hydroxide | | | | | | |
| | Total | | | 100 | 100 | 100 | 100 |
| | Content (F) of elemental iron (Fe) | | ppm | 3.7 | 21.1 | 24.5 | 15.8 |
| | Content (N) of elemental sodium (Na) | | ppm | 5255.1 | 1270.6 | 2566.4 | 0.5 |
| | F/N | | | 0.0007 | 0.02 | 0.01 | 30.85 |
| Flame-retardant resin composition | Weather-resistant colorability (Δb* at 120 h) | | | 4.04 | 11.86 | 10.73 | 7.18 |
| | Weather-resistant colorability (Δb* < 7) | | | A | C | C | C |
| | Thermal colorability (Δb* at 68 h) | | | 11.20 | 8.19 | 8.18 | 8.61 |
| | Thermal colorability (Δb* < 9) | | | B | A | A | A |
| | UL-94V (1.6 mm in thickness, 30% flame retardant added) | | | V-0 | V-0 | V-0 | V-0 |
| | Comprehensive determination | | | B | B | B | B |

| | | | Unit | Comparative Example 5 | Comparative Example 6 | Comparative Example 7 | Comparative Example 8 |
|---|---|---|---|---|---|---|---|
| Sample | | | | 22 | 23 | 24 | 25 |
| Flame retardant composition | Piperazine (poly)phosphate | P1 | % by weight | 20 | 60 | 60 | |
| | | P2 | | | | | |
| | | P3 | | 40 | | | |
| | | P4 | | | | | 60 |
| | | P5 | | | | | |
| | Melamine (poly)phosphate | M1 | | | | | |
| | | M2 | | | 40 | 40 | 40 |
| | | M3 | | 40 | | | |
| | | M4 | | | | | |
| | | M5 | | | | | |
| | Iron (III) phosphate dihydrate | | | | | | |
| | Sodium pyrophosphate | | | | 1.5 | | |
| | Sodium hydroxide | | | | | 0.5 | |
| | Total | | | 100 | 101.5 | 100.5 | 100 |
| | Content (F) of elemental iron (Fe) | | ppm | 1.4 | 1.3 | 1.3 | 41.1 |
| | Content (N) of elemental sodium (Na) | | ppm | 4035.4 | 5112.4 | 2861.0 | 2.0 |
| | F/N | | | 0.00035 | 0.00025 | 0.00045 | 20.27 |
| Flame-retardant resin composition | Weather-resistant colorability (Δb* at 120 h) | | | 3.55 | 2.08 | 2.00 | 8.32 |
| | Weather-resistant colorability (Δb* < 7) | | | A | A | A | C |
| | Thermal colorability (Δb* at 68 h) | | | 14.26 | 9.03 | 9.76 | 7.32 |
| | Thermal colorability (Δb* < 9) | | | B | B | B | A |

TABLE 1-continued

|  | UL-94V (1.6 mm in thickness, 30% flame retardant added) | V-0 | V-0 | V-0 | V-0 |
|---|---|---|---|---|---|
|  | Comprehensive determination | B | B | B | B |

<Measurement of Fe and Na Contents>

50 mL of a 1 M nitric acid aqueous solution was added to 500 mg of a sample of the obtained flame retardant composition, followed by stirring at room temperature (25° C.) for 24 hours, and then the solution passed through a membrane filter was used as a measurement solution. The Fe content (ppm) and Na content (ppm) of this measurement solution were measured using an ICP emission spectroscopic analyzer (device name: SPS3500, manufactured by SII NanoTechnology Inc.). The results are shown in Table 1.

A calibration curve was prepared in a range of 0 to 0.5 ppm or 0.5 to 10 ppm for both Fe and Na.

Both calibration curves were used properly according to the Fe and Na detection intensities of the measurement solution. In a case where the detection intensity was beyond the above-mentioned calibration curve range, the content was measured by diluting the measurement solution with a 1 M nitric acid aqueous solution to a concentration within the calibration curve range.

The Fe content and Na content values of the obtained samples 1 to 25 were plotted at the coordinates of vertical axis: Fe content (ppm) and horizontal axis: Na content (ppm) (FIG. 1). FIG. 2 shows an enlarged view of a region with a low concentration of Na (0 to 20 ppm) in FIG. 1.

Three lines of $8.0 \times 10^{-4} \leq F/N$, $F/N \leq 20.0$, and $F \leq 21.0$ were drawn in the obtained FIG. 1 and FIG. 2. Samples 1 to 17 in the area surrounded by the three lines were designated as Examples 1 to 17, and samples 18 to 25 outside the area were designated as Comparative Examples 1 to 8.

It was confirmed by anion chromatography that the flame retardant compositions of Examples 1 to 17 contained elemental phosphorus derived from pyrophosphoric acid.

<Preparation of Flame-Retardant Resin Composition>

0.05 parts by weight of calcium stearate (lubricant), 0.1 parts by weight of tetrakis[methyl 3-(3,5-di-tert-butyl-4-hydroxyphenyl)propionate]methane (phenolic antioxidant), 0.1 parts by weight of tris(2,4-di-tert-butylphenyl)phosphite (phosphorus-based antioxidant), and 0.3 parts by weight of ADEKASTAB LA-502 (light stabilizer) were blended with 100 parts by weight of polypropylene (grade for injection molding, manufactured by Mitsui Chemicals, Inc.) to obtain a polypropylene resin composition. The obtained polypropylene resin composition was blended with 43 parts by weight of the flame retardant composition obtained in each of Examples 1 to 17 and Comparative Examples 1 to 8. This was followed by press molding at 200° C. to 230° C. to obtain a test piece having a thickness of 1.6 mm.

Using the obtained test piece, the measurement of a UL-94V test according to the following was carried out. In addition, a weather-resistant colorability test and a thermal colorability test were carried out.

<Flame Retardancy>
(UL-94V Test)

UL-94 standard: A test piece with a length of 127 mm, a width of 12.7 mm, and a thickness of 1.6 mm was kept vertical; the lower end of the test piece was brought into contact with a flame of a burner for 10 seconds, the flame was then removed, and the time for extinguishing the fire that ignited the test piece was measured. Next, at the same time as the fire was extinguished, the second flame contact was started for 10 seconds, and the time for extinguishing the ignited fire was measured in the same manner as the first flame contact. In addition, it was also evaluated at the same time whether or not the cotton placed under the test piece was ignited by the falling fire.

Combustion ranks were assigned according to the above-mentioned UL-94 standard based on the first and second combustion times, the presence or absence of cotton ignition, and the like. The combustion rank is highest at V-0, and the flame retardancy decreases as the combustion rank becomes V-1 and V-2. In this regard, the case that does not correspond to any of the ranks of V-0 to V-2 is defined as NR. The results are shown in Table 1.

<Weather-Resistant Colorability>

Using the obtained test piece, a weather-resistant colorability test was carried out under conditions of a SUNSHINE WEATHER METER (manufactured by Suga Test Instruments Co., Ltd.) and rain at 63° C., and the degree of yellowing (Δb*) at 120 hours was measured. A spectrophotometer SD3000 (manufactured by Nippon Denshoku Industries Co., Ltd.) was used for measuring the degree of yellowing.

The measured degree of yellowing (Δb*) was evaluated based on the following evaluation criteria. The results are shown in Table 1.

A: Δb* is 6.00% or less
B: Δb* is more than 6.00% and 7.00% or less.
C: Δb* is more than 7.00%

<Thermal Colorability>

The obtained test piece was allowed to stand in a constant temperature bath at 150° C. using a high-temperature incubator (manufactured by ESPEC CORP.), and the degree of yellowing (Δb*) at 68 hours was measured. A spectrophotometer SD3000 (manufactured by Nippon Denshoku Industries Co., Ltd.) was used for measuring the degree of yellowing.

The measured degree of yellowing (Δb*) was evaluated based on the following evaluation criteria. The results are shown in Table 1.

A: Δb* is 9.00% or less
B: Δb* is more than 9.00%

<Comprehensive Determination>

As a result of evaluating the above-mentioned evaluation items, the comprehensive determination was evaluated as A in a case where the result was flame retardancy of V-0, weather-resistant colorability of A or B, and thermal colorability of A; and the comprehensive determination was evaluated as B in a case where the flame retardancy was not V-0, the weather-resistant colorability was C, or the thermal colorability was B.

The flame retardancy of the flame-retardant resin composition could be improved by using the flame retardant compositions of Examples 1 to 17, and therefore the results showed that the weather-resistant colorability was excellent as compared with Comparative Examples 2 to 4 and 8, and the thermal colorability was excellent as compared with Comparative Examples 1 and 5 to 7.

It was found that such flame retardant compositions of Examples can be suitably used as a flame retardant from the viewpoint of being capable of improving the flame retardancy, weather-resistant colorability, and thermal colorability of a thermoplastic resin.

This application claims priority based on Japanese Patent Application No. 2019-137987 filed on Jul. 26, 2019, the disclosure of which is herein incorporated by reference in its entirety.

The invention claimed is:

1. A flame retardant composition comprising a combination of melamine (poly)phosphate and piperazine (poly)phosphate, wherein F and N satisfy $8.0 \times 10^{-4} \leq F/N \leq 20.0$ and $F \leq 16.5$, wherein F (ppm) is a content of elemental iron and N (ppm) is a content of elemental sodium in the flame retardant composition as measured in accordance with the following procedure, (Procedure)

a sample of the flame retardant composition is mixed with a 1 M nitric acid aqueous solution, and the mixture is stirred at room temperature of 25° C. for 24 hours and then passed through a membrane filter to prepare a measurement solution, and the contents of elemental iron and elemental sodium are measured for the obtained measurement solution by using ICP emission spectroscopic analysis.

2. The flame retardant composition according to claim 1, wherein N satisfies $N \leq 5.1 \times 10^3$.

3. The flame retardant composition according to claim 1, wherein the flame retardant composition includes at least a pyrophosphate from the group of the (poly)phosphates consisting of an orthophosphate, the pyrophosphate, and a polyphosphate having n of 3 or more or r of 3 or more, each of which is represented by General Formula (1) or General Formula (3),

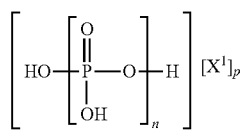
(1)

wherein in General Formula (1), n represents a number from 1 to 100, $X^1$ represents ammonia or a triazine derivative represented by General Formula (2), and p is a number that satisfies the relational expression of $0 < p \leq n+2$;

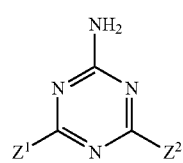
(2)

in General Formula (2), $Z^1$ and $Z^2$ may be the same or different from each other and each represent a group selected from the group consisting of a $-NR^5R^6$ group, a hydroxyl group, a mercapto group, a linear or branched alkyl group having 1 to 10 carbon atoms, a linear or branched alkoxy group having 1 to 10 carbon atoms, a phenyl group, and a vinyl group, and $R^5$ and $R^6$ each independently represent a hydrogen atom, a linear or branched alkyl group having 1 to 6 carbon atoms, or a methylol group; and

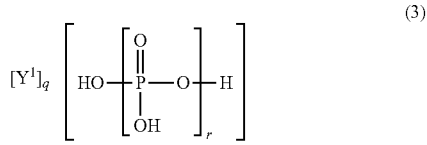
(3)

in General Formula (3), r represents a number from 1 to 100, $Y^1$ is $[R^1R^2N(CH_2)_mNR^3R^4]$, piperazine, or a diamine containing a piperazine ring, $R^1$, $R^2$, $R^3$, and $R^4$ are each a hydrogen atom or a linear or branched alkyl group having 1 to 5 carbon atoms, and $R^1$, $R^2$, $R^3$, and $R^4$ may be the same or different from one another, m is an integer of 1 to 10, and q is a number that satisfies the relational expression of $0 < q \leq r+2$.

4. The flame retardant composition according to claim 3, wherein the flame retardant composition includes the orthophosphate and the pyrophosphate.

5. The flame retardant composition according to claim 3, wherein the flame retardant composition includes the pyrophosphate in which $X^1$ in General Formula (1) is melamine.

6. The flame retardant composition according to claim 3, wherein the flame retardant composition includes the pyrophosphate in which $Y^1$ in General Formula (3) is piperazine.

7. The flame retardant composition according to claim 3, wherein the flame retardant composition includes the pyrophosphate in which $X^1$ in General Formula (1) is melamine, and the pyrophosphate in which $Y^1$ in General Formula (3) is piperazine.

8. The flame retardant composition according to claim 1, wherein the flame retardant composition satisfies (P1/P0) of 0.01 or more, wherein P0 is a content of elemental phosphorus in the entire flame retardant composition measured by ICP emission spectroscopic analysis, and P1 is a content of elemental phosphorus derived from pyrophosphoric acid in the flame retardant composition measured by anion ion chromatography, in the measurement solution obtained according to the procedure.

9. The flame retardant composition according to claim 1, wherein a content of the (poly)phosphate is 20% by weight or more with respect to 100% by weight of the flame retardant composition.

10. The flame retardant composition according to claim 1, further comprising an aid.

11. The flame retardant composition according to claim 1, further comprising a surface treatment agent.

12. The flame retardant composition according to claim 1, further comprising a dust suppressant.

13. A flame-retardant resin composition comprising:
the flame retardant composition according to claim 1; and
a thermoplastic resin.

14. The flame-retardant resin composition according to claim 13, wherein the thermoplastic resin includes a polyolefin-based resin.

15. A molded article of the flame-retardant resin composition according to claim 13.

16. A method for producing a molded article, comprising a step of producing the molded article using the flame-retardant resin composition according to claim 13.

* * * * *